US005618414A

United States Patent [19]
Goupil et al.

[11] Patent Number: 5,618,414
[45] Date of Patent: Apr. 8, 1997

[54] TREATMENT SYSTEM FOR TREATING WASTE WATER

[75] Inventors: Patrick Goupil; Martin Pelletier; Rémy Simoneau, all of Rivière-du-Loup; Claude Talbot; Pierre Talbot, both of Notre-Dame-du-Portage, all of Canada

[73] Assignee: Premier Tech ltee, Quebec, Canada

[21] Appl. No.: 528,280

[22] Filed: Sep. 14, 1995

[30] Foreign Application Priority Data

May 11, 1995 [CA] Canada ................................ 2149202

[51] Int. Cl.⁶ ........................................ C02F 3/04
[52] U.S. Cl. ................ 210/151; 210/170; 210/218; 210/232; 210/188; 210/472; 210/456
[58] Field of Search ............................. 210/218, 232, 210/150, 151, 170, 188, 532.2, 472, 456

[56] References Cited

U.S. PATENT DOCUMENTS 978,889  12/1910  Imhoff .
2,308,866  1/1943  Deteema ................................ 210/151
3,879,285  4/1975  Yost ...................................... 210/532.2
3,933,641  1/1976  Hadden et al. .
5,049,265  9/1991  Boyd et al. ............................. 210/150

OTHER PUBLICATIONS

Rhebau, Lösungen für den Gewässerschutz, *Prüfzeichen*, PA-1 3689 (with English abstract).
Bordnamóna, Environmental Products U.S., Inc., Puraflo, The Puraflo™ System, Publicity.

*Primary Examiner*—Robert J. Popovics
*Attorney, Agent, or Firm*—Lowe, Price, LeBlanc & Becker

[57] ABSTRACT

A treatment system is described for treating waste water, comprising a container having an upper and a lower portion, at least one elongated hollow casing within the lower portion of the container, inlets, openings, or vents for aerating the treatment system and at least one distribution system for distributing the waste water entering the container into at least one treatment chamber defined by the casing. A combination of a septic tank and a treatment system is also described.

20 Claims, 7 Drawing Sheets

TREATMENT SYSTEM FOR TREATING WASTE WATER

FIELD OF THE INVENTION

The present invention relates to a treatment system for treating waste water.

BACKGROUND OF THE INVENTION

Conventionally, waste water like the liquid effluent leaving a sceptic tank is treated in a mechanically aerated treatment plant, or in soil or sand absorption systems. In the former case, the installation and operation costs of the system are high and limiting. In the latter case and to be efficacious, the absorption systems require a large surface of land which is not available for everyone. Furthermore, some soils with high ground-water tables or with low permeability characteristics are not favourable for use as an absorption field.

An alternative system for treating on-site the waste water is thus required in these areas.

Known in the art for this purpose are filtering systems comprising peat-containing modules or other adapted filtering media. With these systems, the liquid effluent is pumped into the modules, distributed at low pressure over the peat, filtered through the same while it is treated by naturally occurring microorganisms or by other chemico-physical phenomena. Tile liquid emerging from the modules is a "treated" liquid which can be dispersed into a shallow bed and then into surrounding soils or eliminated by dilution in a water stream.

As can easily be understood, it is desirable that the waste water treatment system be properly ventilated and aerated to ensure aerobic treatment within the modules and also to prevent the formation of a pressure gradient in the filtering means, which would slow the filtering process and affect its efficiency. For a better efficacy of the treatment system, it is also desirable to distribute the waste water over the full surface of each module. In this regard, it is desirable that the waste water to be treated be split or divided in equal volumes while the water still has a high energy. With this approach, there is no need to rigorously make the distribution system level as it is installed. This approach also prevents accumulation of biomass on the distribution device harmful to the flow division of the waste water. Furthermore, it is also desirable that the waste water treatment system be very simple and rapid to install and maintain.

SUMMARY OF THE INVENTION

The object of the present invention is to provide a treatment system for treating waste water which satisfies these needs.

More particularly, the object of the present invention is to provide a treatment system for treating waste water comprising a container having an upper portion, a lower portion, at least one waste water inlet in the upper portion of the container for receiving the waste water, and an opening in the lower portion of the container for allowing the treated water to escape the container.

At least one elongated hollow casing is mounted within the lower portion of said container. This casing has an open bottom surface and defines at least two treatment chambers within said container, each of the treatment chambers comprising filtering means for treating the waste water.

Means are provided for distributing the waste water entering the container through the waste water inlet into at least one of the treatment chambers.

Aerating means are also provided, comprising:
- at least one air inlet provided in the container for allowing air to enter the upper portion of the container;
- at least one opening on top of the casing for allowing air in the upper portion of the container to enter the casing;
- an air outlet in the casing for allowing air to exit the casing; and
- an air outlet pipe connected to the air outlet of the casing and exiting the container, the air outlet pipe being designed to be connected to an air vent.

In use, while the waste water entering the container is filtered in the treatment chambers, air is allowed to flow through each air inlet over the filtering means and then through the casing to the air vent.

Another object of the present invention is to provide a treatment system for treating waste water, the system comprising a container having an upper portion, a lower portion, at least one waste water inlet in the upper portion of the container for receiving the waste water, and an opening in the lower portion of the container for allowing the treated water to escape this container.

At least one elongated hollow casing is mounted within the lower portion of the container. This casing has an open bottom surface and defines at least two treatment chambers within said container, each of the treatment chambers comprising filtering means for treating the waste water.

Means are provided for aerating the treatment system.

At least one distribution means is also provided for distributing the waste water entering the container through the waste water inlet into at least one of the treatment chambers. Each distribution means comprises a water inlet pipe connected to the water inlet and leading above the casing and a trough tiltably mounted on top of a corresponding casing. The trough extends along the casing and has two opposite sides. It defines at least one wastewater receiving means on one of the two sides and it is tiltable between a first position where the waste-water receiving means receives waste water exiting the water inlet pipe and a second position where the waste water received in the receiving means may flow out of the same. The trough also has counterweight means on its other side for holding it in the first position while it is filled up and for bringing it back from the second position to the first position after said at least one waste-water receiving means has been emptied.

In addition, at least one distribution plate is mounted above the filtering means in one of the treatment chambers defined by the corresponding hollow casing. This at least one distribution plate comprises a plurality of channels projecting from the trough, each of the channels having an end for receiving waste water flowing from the trough so that the waste water is divided into a plurality of flows each flowing in a corresponding channel, each of the channels also having at least one opening for letting the waste water drip into the corresponding treatment chamber.

A further object of the present invention is to provide a combination of a pre-treatment system, preferably a sceptic tank with a treatment system as defined hereinabove for treating waste water leaving said pre-treatment system.

Advantageously, the hollow casing used in the treatment system according to the present invention prevents pressure gradient into the treatment chambers by allowing air above the filtering means to be in open communication with the area under the hollow casing. This area may contain a layer of crushed stones or other porous material. The hollow casing may also be used for supporting a person doing the maintenance or inspection of the treatment chambers.

Advantageously also, the tiltable trough combined with the distribution plate allows the waste water to be uniform-ly and efficaciously distributed over the filtering means. Furthermore, the treatment system according to the present invention is a compact one-piece design which makes it easy and quick to install and preserves existing landscaping.

A non restrictive description of a preferred embodiment will now be given with reference to the appended drawings.

Figure 1:
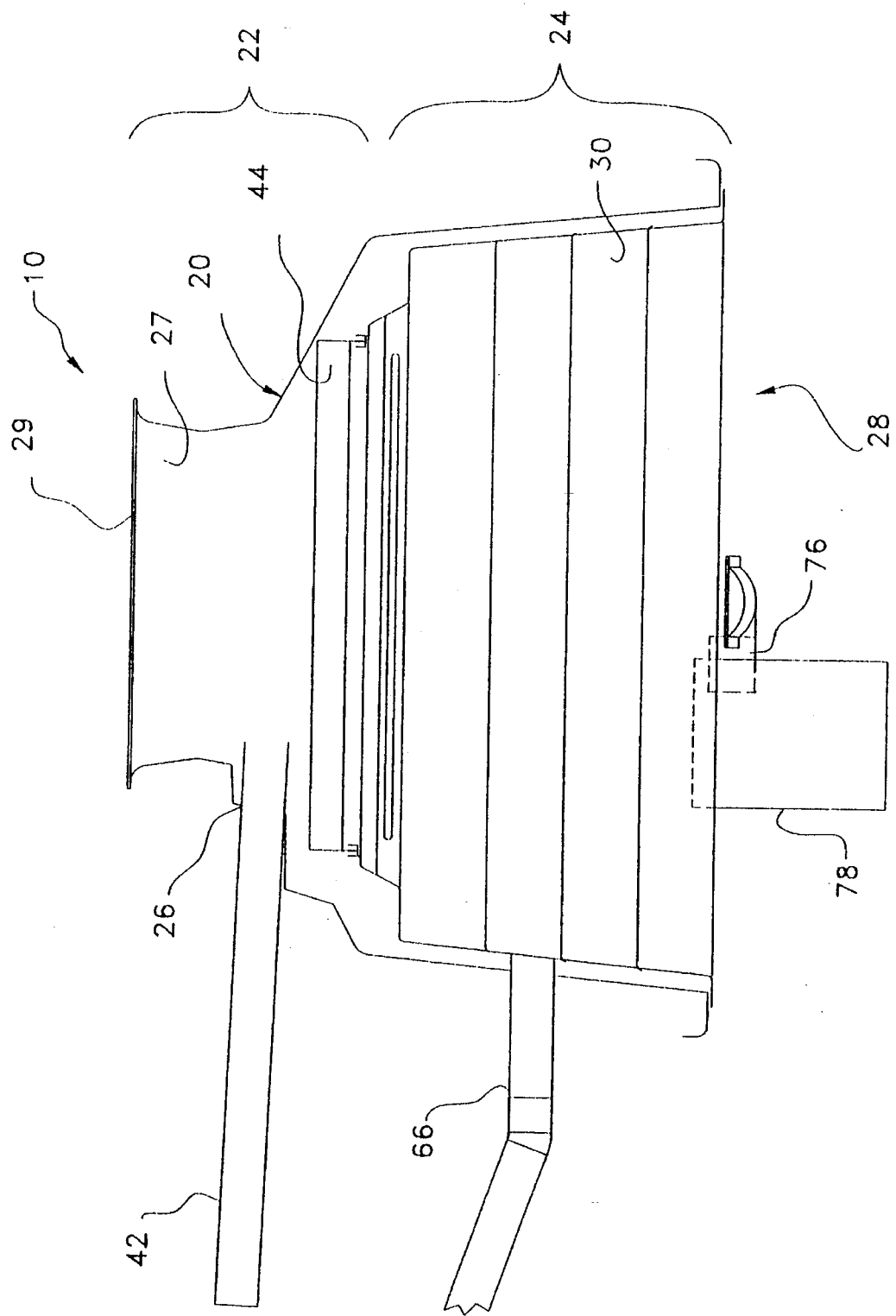
FIG. 1 is a side elevational, cross-sectional view of a first preferred embodiment of a treatment system according to the present invention.

NUMERAL REFERENCE OF THE ELEMENTS 10 treatment system
20 container
22 upper portion of the container
24 lower portion of the container
26 waste water inlet
28 opening
30 casing
32 open bottom surface of the casing
36 treatment chamber
37 filtering means
38 treatment chamber
39 filtering means
42 water inlet pipe
44 trough
46 waste-water receiving means
48 counterweight means
50 distribution plate
52 channels
54 end for receiving waste water
56 openings of the channels
58 partition wall
60 air inlet
62 opening on top of casing
64 air outlet in the casing
66 air outlet pipe
68 air inlet piping
72 gutter
74 collecting portion
76 delivering end
78 tank
80 collecting means
81 pump
82 second-stage filtering chamber within the hollow casing
90 sceptic tank
92 water outlet pipe of the sceptic tank
94 ventilating piping
96 air vent

DESCRIPTION OF PREFERRED EMBODIMENTS

In a preferred embodiment of the invention, the treatment system for treating waste water comprises a container having a waste water inlet for receiving the waste water and an opening for allowing the treated water to escape the container. An elongated hollow casing within the container and having an open bottom surface is defining two treatment chambers comprising filtering material as peat for treating the waste water. The treatment system further comprises an air inlet provided in the container for allowing air to enter the container, openings on top of the casing for allowing air in the upper portion of the container to enter the casing, an air outlet in the casing for allowing air to exit the casing, and finally an air outlet pipe connected to the air outlet of the casing and exiting the container. The air outlet pipe is designed to be connected to an air vent. While the waste water entering the container is filtered in the treatment chambers, air is allowed to flow though the air inlet over the filtering material and then through the casing to the air vent. For distributing the waste water entering the container into the treatment chambers, the treatment system comprises a water inlet pipe connected to the water inlet of the container and leading above the casing. It also comprises a trough tiltably mounted on top of the casing and extending along the casing. The trough has two opposite sides and is tiltable between a first position where one side receives waste water exiting the water inlet pipe and a second position where the waste water received may flow out of the same. The trough also has counterweight on its other side for holding the trough in the first position while it is filled up and for bringing it back from the second position to the first position after the waste water has been emptied. Two distribution plates mounted above the peat in the treatment chambers are also provided. The distribution plate comprises a plurality of channels projecting from the trough and has an end for receiving waste water flowing from the trough so that the waste water is divided into a plurality of flows each flowing in a corresponding channel. The channels also have at least one opening for letting the waste water drip into the corresponding treatment chamber. Advantageously, the treatment system may be combined with a septic tank or other pre-treatment systems for treating the raw waste water leaving the septic tank.

Figure 2:
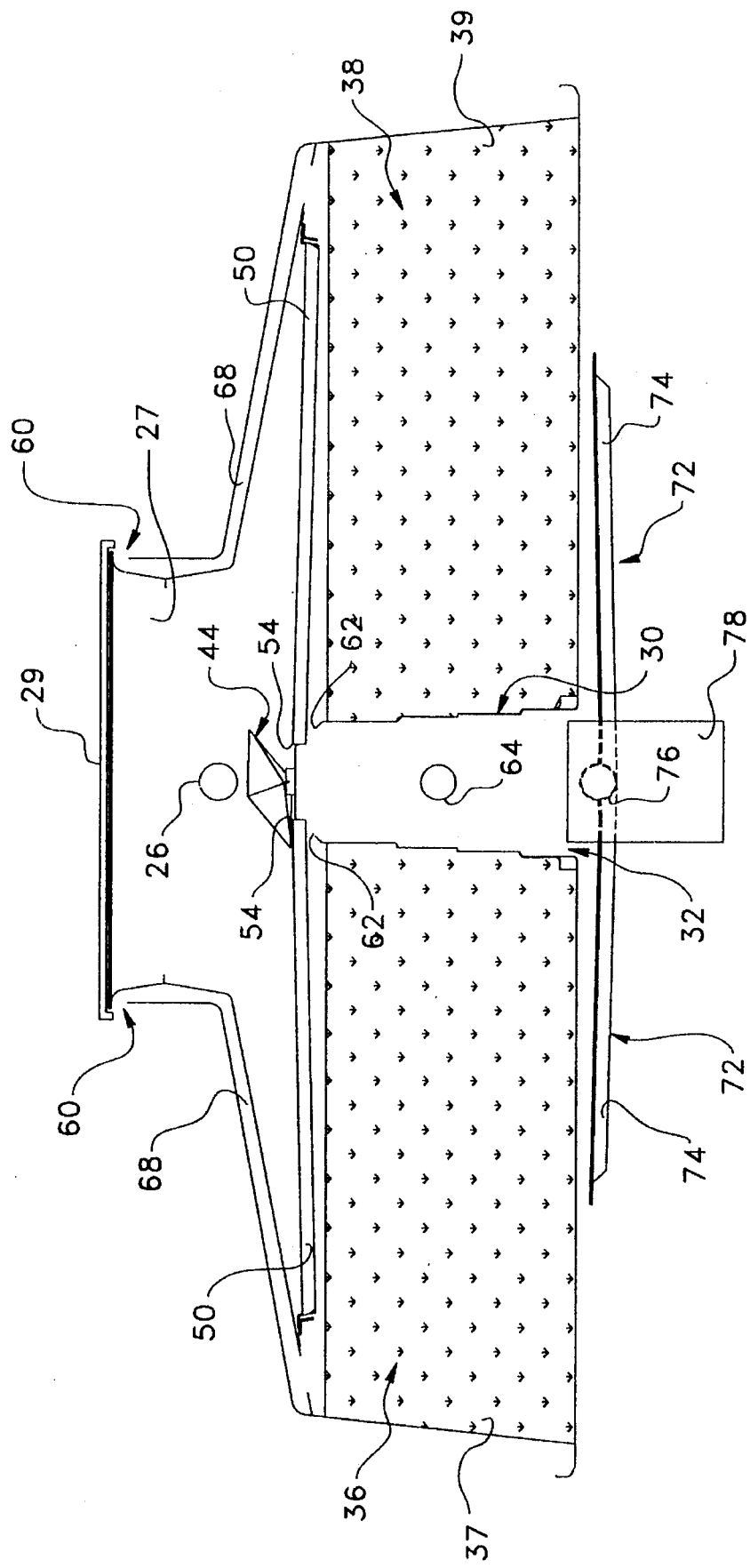
FIG. 2 is a front elevational, cross-sectional view of the treatment system shown in FIG. 1.

FIGS. 1 and 2 show a treatment system 10 for treating waste water according to a first embodiment of the present invention.

The treatment system 10 comprises a container 20 having an upper portion 22 and a lower portion 24. It also has a waste water inlet 26 in the upper portion 22 of the container 20 for receiving the waste water. Obviously, in another preferred embodiment of the present invention, the container 20 may be provided with more than one waste water inlet for receiving waste water from different locations.

The container 20 is also provided with an opening 28 in the lower portion of the container 20 for allowing the treated water to escape the container 20. In this preferred embodiment, the opening 28 is simply constituted by the bottom of the container, which is not closed. Preferably, the container is provided with a large opening 27 on its top surface. This opening 27 may be closable with a cover 29 for allowing easy maintenance or inspection of the system, as illustrated in FIG. 2 or with double closable covers (not illustrated) comprising air in between.

The treatment system 10 further comprises at least one elongated hollow casing 30 within the lower portion 24 of the container 20. Preferably, as illustrated, the treatment system 10 comprises only one such casing 30. The casing 30 has an open bottom surface 32 and is defining two treatment chambers 36,38 within the container 20. Each of the treatment chambers 36,38 comprises filtering means 37 for treating the waste water. Preferably, the filtering means 37,39 consists of a bed of peat or other material media presenting high capacities for waste water treatment.

In another preferred embodiment of the present invention (not illustrated), which could be used for treating a much more important quantity of waste water, the treatment system could comprise more than one hollow casing so as to define more than two treatment chambers.

Aerating Means

The aerating means of the treatment system comprises at least one air inlet 60 provided in the container 20 for allowing air to enter the upper portion 22 of the container 20. Preferably, as illustrated in FIGS. 1 and 2, the aerating means further comprises an air inlet piping 68 connected with the at least one air inlet 60 and entering into the treatment chambers 36,38 in an area above the filtering means 37,39.

The aerating means also comprises at least one opening 62 oil top of the casing 30 for allowing air to enter the casing 30 and an air outlet 64 in the casing 30 for allowing air to exit the casing 30, and thus to increase air circulation over and inside the filtering means.

Finally, an air outlet pipe 66 is connected to the air outlet 64 of the casing 30 and is exiting the container 20. The air outlet pipe 66 is designed to be connected to an air vent.

While the waste water entering the container 20 is filtered in the treatment chambers 36,38, air is allowed to flow through the air inlet 60 over the filtering means 37,39, and then through the casing 20 to the air vent. Advantageously, such air circulation allows a better oxygenation of the filtering means.

Figure 3:
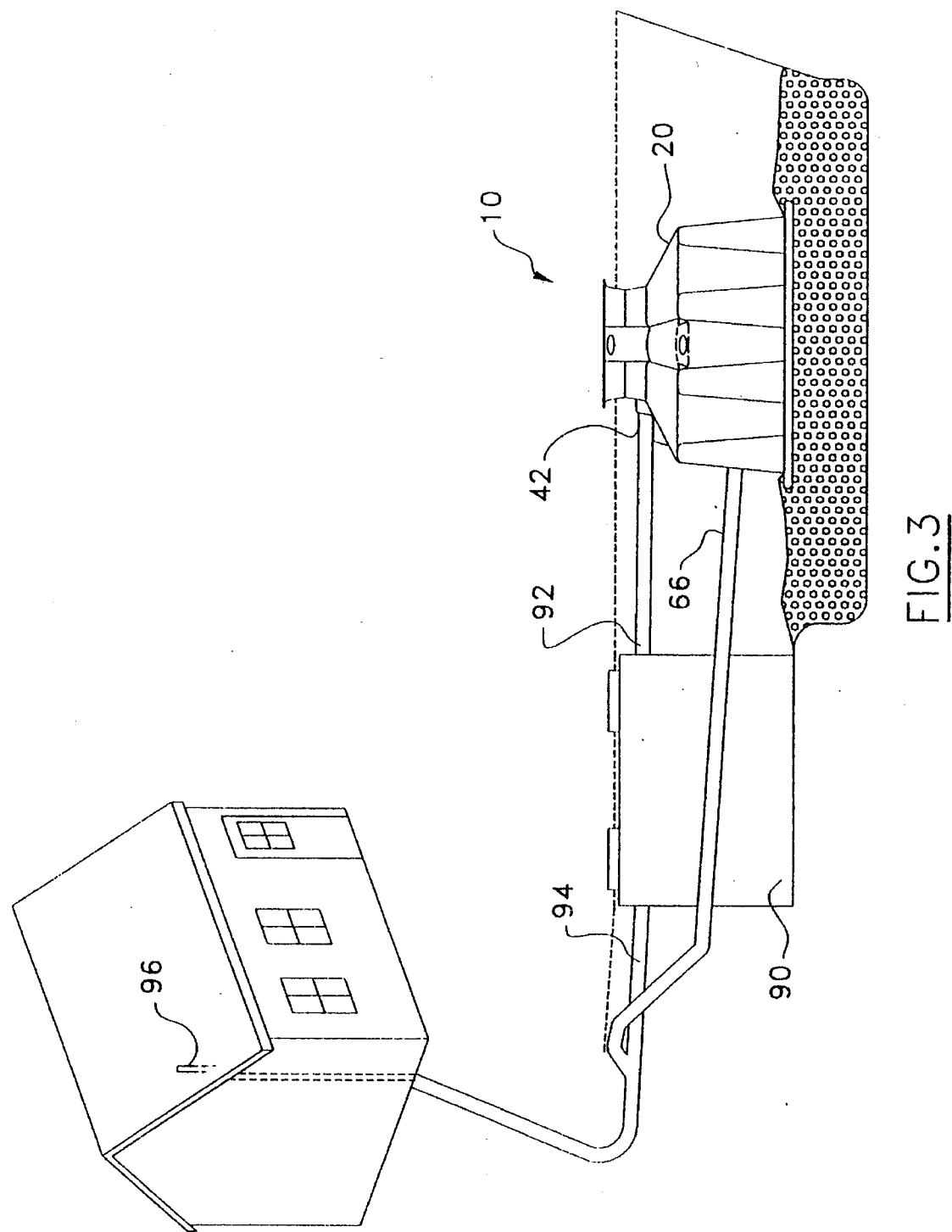
FIG. 3 is a side elevational view of the treatment system shown in FIG. 1 combined with a sceptic tank.

As illustrated in FIG. 3, the treatment system 10 according to the invention can advantageously be combined with a sceptic tank 90 for treating waste water leaving the sceptic tank 90. However, the treatment system according to the present invention could be used in combination with any other source of waste water or pre-treatment system.

The pre-treatment system, preferably the sceptic tank 90, comprises a water outlet pipe 92 for allowing waste water to exit the tank 90 and a ventilating piping 94 connected to an air vent system 96, preferably located on the roof of a house.

In this combination, the air outlet pipe 66 of the casing 30 is connected to the ventilating piping 94 of the sceptic tank 90, and thus by-passes the sceptic tank.

In another preferred embodiment, the air outlet pipe 66 of the casing 30 may be connected to the water outlet pipe 92. In this system, the treatment system 10 is ventilated while no waste water is flowing from the sceptic tank 90.

Distributing Means

The treatment system 10 further comprises means for distributing the waste water entering the container 20 through the waste water inlet 26 into at least one of the treatment chambers 36,38.

Preferably, as illustrated, the distributing means comprises a water inlet pipe 42 connected to the waste water inlet 26 of the container 20 and leading above the casing 30. In the combination with the sceptic tank 90, illustrated in FIG. 3, the water outlet pipe 92 of the sceptic tank 90 is connected to the water inlet pipe 42 of the container.

Figure 4:
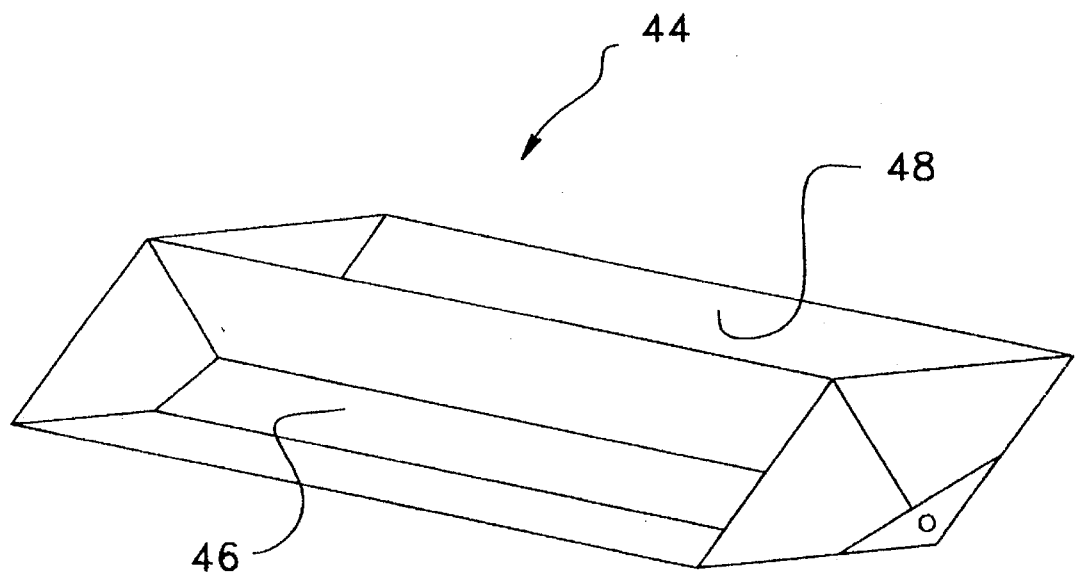
FIG. 4 is a perspective view of the trough used in the system shown in FIGS. 1 and 2.
Figure 5:
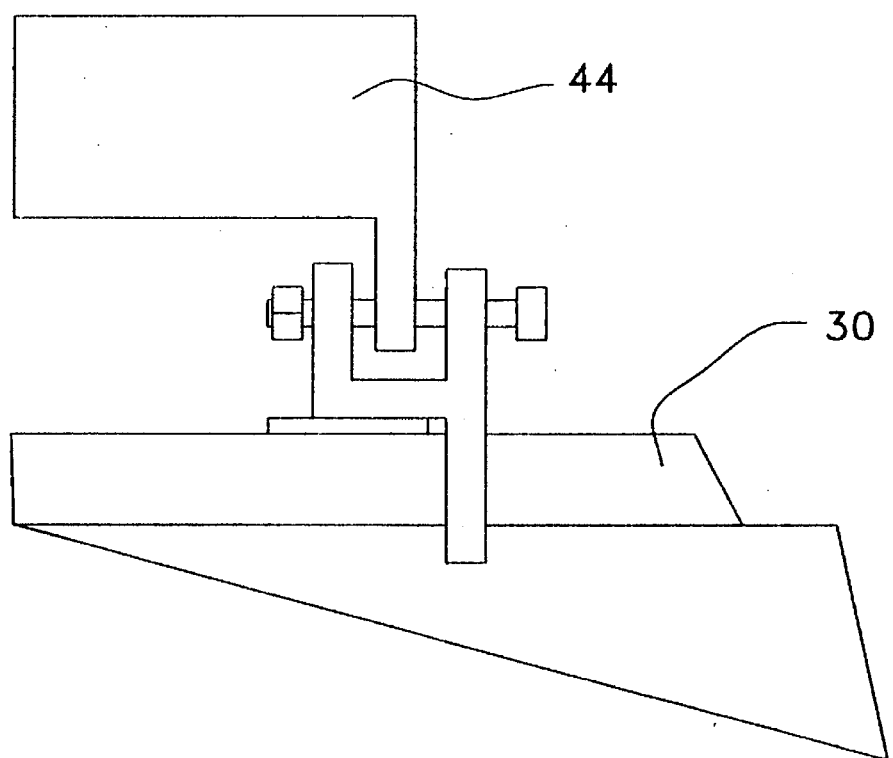
FIG. 5 is an enlarged partial view of FIG. 1, showing the way the trough is mounted on the casing.

The distributing means also comprises a trough 44 tiltably mounted on top of the casing 30. A preferred embodiment of a trough 44 according to the present invention is illustrated in FIGS. 4 and 5.

The trough 44 is extending along the casing 30 and has two opposite sides. It is defining at least one waste-water receiving means 46 on one of the two sides and is tiltable between a first position where the waste-water receiving means 46 receives waste water exiting the water inlet pipe 76 and a second position where the waste water received in the receiving means 46 may flow out of the same. The trough 44 also has counterweight means 48 on its other side for holding the trough 44 in the first position while it is filled up and for bringing it back from the second position to the first position after the at least one waste-water receiving means 46 has been emptied.

The counterweight means of the first preferred embodiment illustrated in FIGS. 1 and 2 comprises an additional waste-water receiving means 48 for receiving waste water exiting the water inlet pipe 42 while the trough 44 is in the second position. The waste water received in the additional waste-water receiving means 48 is flowing out of the same while the trough 44 is in the first position.

As can be noted, in this first preferred embodiment, the waste water entering the container 20 is equally distributed in an alternative manner into the two treatment chambers 36,38.

The distributing means further comprises at least one distribution plate 50 (two are shown in the illustrated embodiment of FIG. 1). The distribution plates 50 are mounted above the filtering means in the treatment chambers 36,38 defined by the hollow casing 30.

Figure 7:
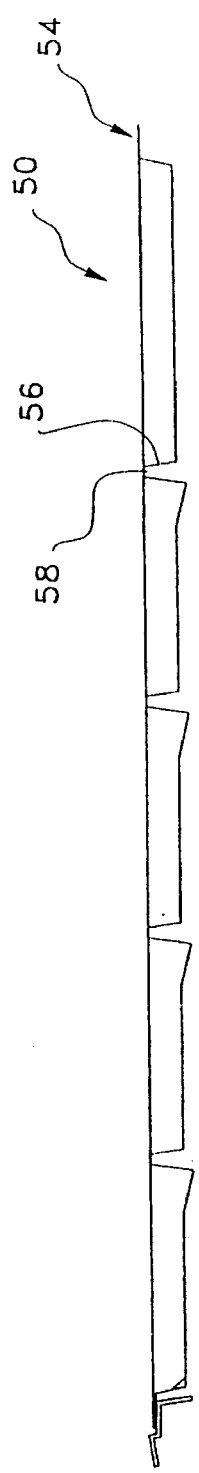
FIG. 7 is a side elevational view of the distribution plate shown in FIG. 5.
Figure 6:
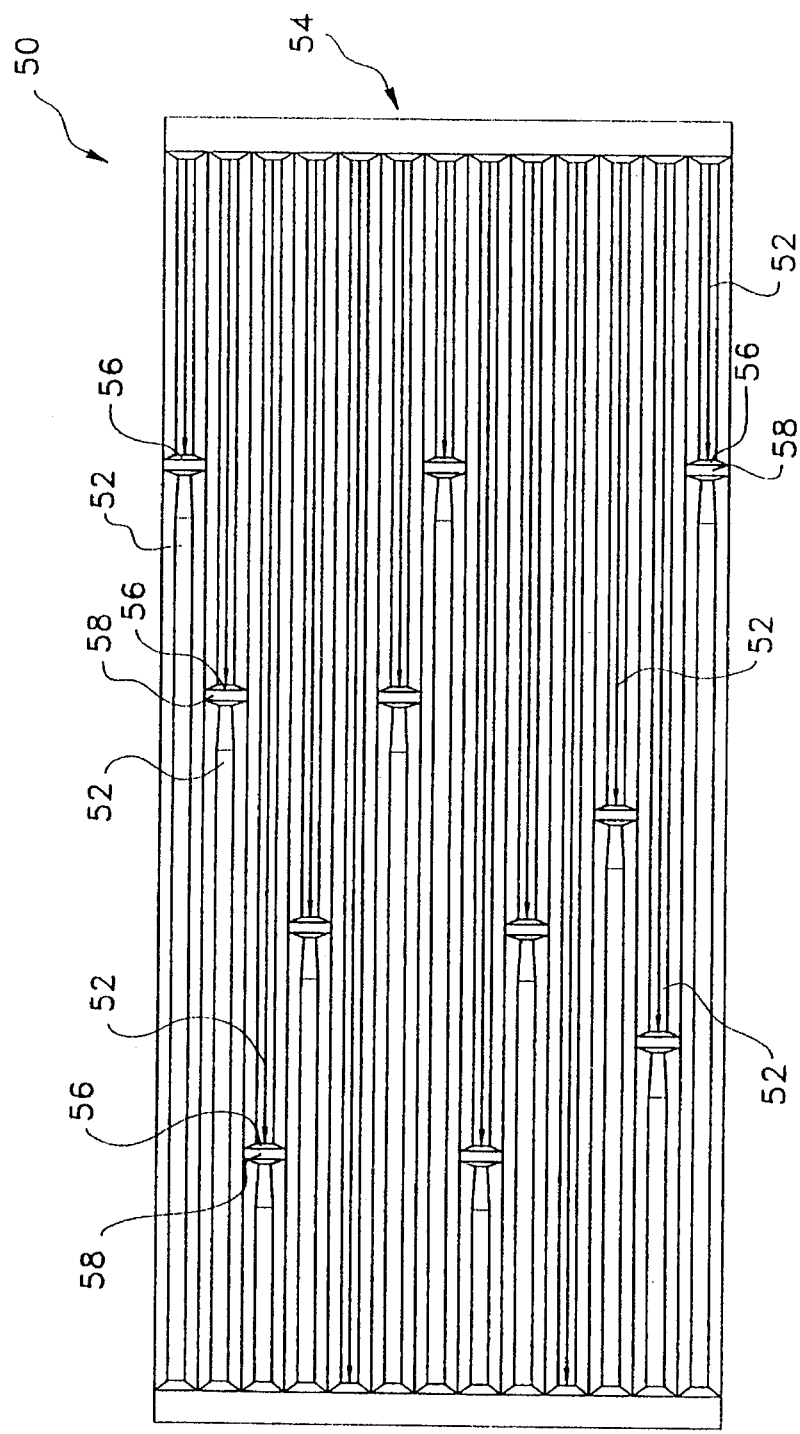
FIG. 6 is a top plan view of the distribution plate shown in FIGS. 1 and 2.

As illustrated in FIGS. 6 and 7, each of the distribution plates 50 comprises a plurality of channels 52 projecting from the trough 44. These channels 52 have an end 54 for receiving waste water flowing from the trough 44 so that the waste water is divided into a plurality of flows, each flowing in a corresponding channel. Each of the channels 52 also has at least one opening 56 for letting the waste water drip into the corresponding treatment chamber.

Preferably, each of the channels 52 further comprises a partition wall 58 extending transversely behind each of the openings 56 with reference to the receiving end 54 of the plate 50. These partition walls allow the flow of water in the channels to be splashed and thus the partition walls may absorb a part of the water energy.

Figure 8:
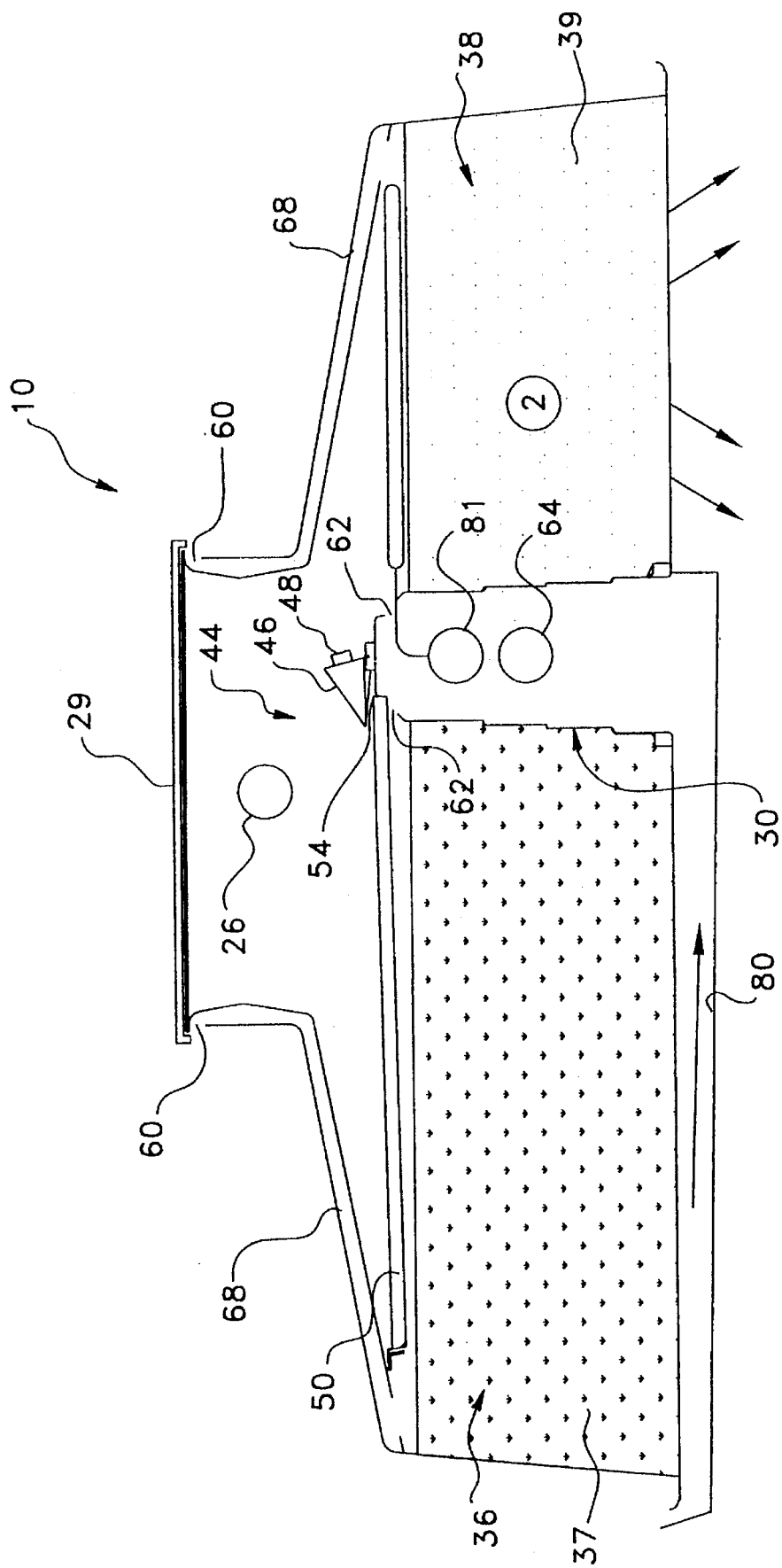
FIG. 8 is a front elevational, cross-sectional view of a second preferred embodiment wherein the waste water is distributed into only one treatment chamber and wherein the water is further treated into the other treatment chamber.

In a second preferred embodiment of the invention illustrated in FIG. 8, the waste water entering the container 20 is distributed into only one of the treatment chambers 36 and the counterweight means comprises a load weight mounted on the other side of the trough 44. In this second preferred embodiment, the distributing means comprises at least one distribution plate 50 mounted in the only one treatment chamber 36.

The treatment system 10 of this second preferred embodiment comprises collecting means 80 below the container 20 for collecting the treated water and means 81 such as a pump for bringing the treated water collected into the other treatment chamber 38 for further treatment of the water, indicated by a circled 2 in FIG. 8.

As aforesaid, the treated water can be brought to the other treatment chamber by means of a piping system and a pump which does not need further description.

Figure 9:
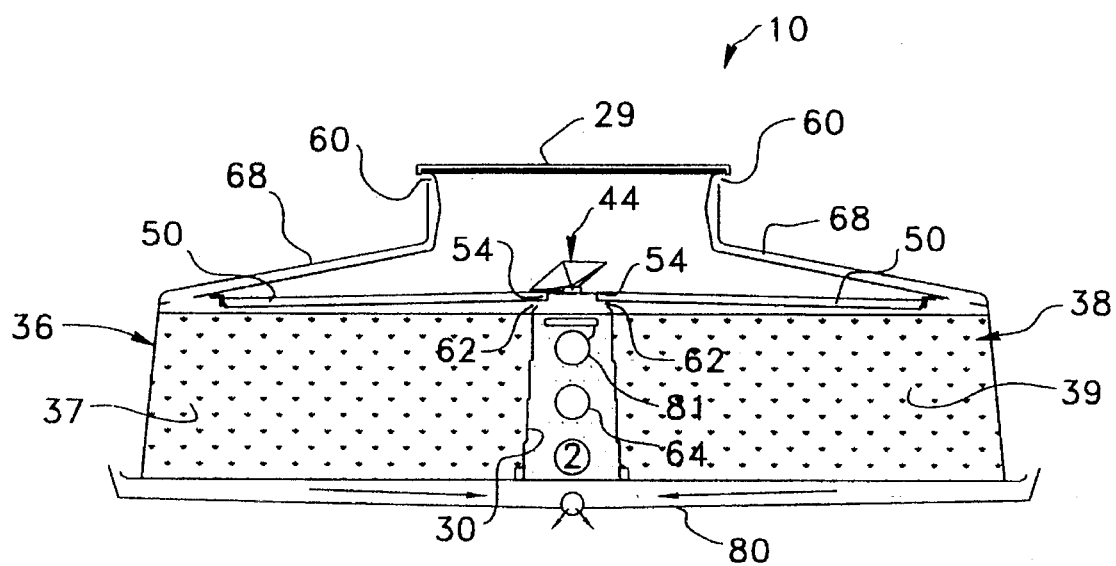
FIG. 9 is a front elevational, cross-sectional view of a third preferred embodiment of a treatment system according to the present invention and comprising a second-stage treatment chamber within the hollow casing for further treatment of the water.

FIG. 9 shows a third preferred embodiment of the invention, wherein the waste water is distributed into the two treatment chambers 36,38.

In this third preferred embodiment, the system further comprises collecting means 80 below the container 20 for collecting the treated water. It also comprises a second-stage filtering chamber 62 within the hollow casing 30. The second-stage filtering chamber 82 comprises additional filtering means. Finally, it comprises means for bringing the treated water collected by the collecting means 80 into the second stage filtering chamber 82 for further treatment of the water, indicated by a circled 2 in FIG. 9.

Figure 10:
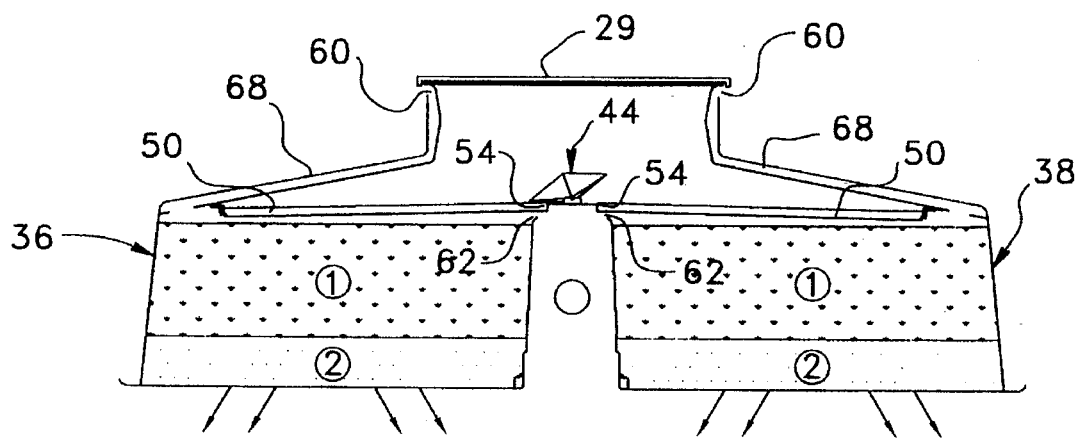
FIG. 10 is a front elevational, cross-sectional view of a fourth preferred embodiment wherein the filtering means in the treatment chambers comprises two layers of different kinds of filtering means.

FIG. 10 shows a fourth preferred embodiment of the invention, wherein the filtering means 37,39, which may be partially constituted of peat or other filtering material, comprise two layers of different kinds of material (indicated by circled 1 and 2) for further treatment of the water.

Preferably, each one of the preferred embodiments described hereinbefore, and especially the ones without collecting means, further comprises sampling means for sampling the treated water. As illustrated in FIGS. 1 and 2, the sampling means comprises at least one gutter 72. The gutter 72 has a collecting portion 74 located under one of the treatment chambers for collecting treated water from the chamber. It also has a delivering end 76 for exiting the treated water and a tank 78 for receiving the treated water from the delivering end 76 of the gutter 72.

Preferably also, the treatment system 10 according to the present invention may further comprise a fan or a ventilator (not illustrated) operatively connected to the at least one air inlet 60 of the container 20. It may also comprise an air filtering means (not illustrated) connected to the air inlet 60 for filtering the air, especially when reversed phenomena of the air circulation occur.

Although preferred embodiments of the invention have been described in detail herein and illustrated in the accompanying drawings, it is to be understood that the invention is not limited to these precise embodiments and that various changes and modifications may be effected therein without departing from the scope or spirit of the invention.

What is claimed is:

1. A treatment system for treating waste water, said treatment system comprising:
   a container having an upper portion, a lower portion, at least one waste water inlet in the upper portion of the container for receiving the waste water, and an opening in the lower portion of said container for allowing the treated water to escape said container;
   at least one elongated hollow casing within the lower portion of said container, said casing having an open bottom surface, said at least one casing defining at least two treatment chambers within said container, each of the treatment chambers comprising filtering means for treating the waste water;
   means for aerating the treatment system;
   at least one distribution means for distributing the waste water entering the container through the waste water inlet into at least one of said treatment chambers, each of said at least one distribution means comprising;
      a water inlet pipe connected to said water inlet and leading above said casing;
      a trough tiltably mounted on top of a corresponding casing, said trough extending along said casing and having two opposite sides, said trough defining at least one waste-water receiving means on one of said two sides, said trough being tiltable between a first position where said waste-water receiving means receives waste water exiting the water inlet pipe and a second position where the waste water received in the receiving means may flow out of the same, said trough also having counterweight means on its other side for holding said trough in said first position while it is filled up and for bringing it back from said second position to said first position after said at least one waste-water receiving means has been emptied; and
      at least one distribution plate mounted above the filtering means in one of said treatment chambers defined by said corresponding hollow casing, said at least one distribution plate comprising a plurality of channels projecting from said trough, each of said channels having an end for receiving waste water flowing from the trough so that said waste water is divided into a plurality of flows each flowing in a corresponding channel, each of said channels also having at least one opening for letting the waste water drip into the corresponding treatment chamber.

2. A treatment system as claimed in claim 1, wherein each of said channels further comprises a partition wall extending transversely behind each of said at least one opening with reference to said end for receiving the waste water.

3. A treatment system as claimed in claim 1, comprising only one of said at least one hollow casing, said one casing defining two treatment chambers, and only one of said at least one distributing means.

4. A treatment system as claimed in claim 3, wherein:
   the waste water entering the container is distributed into only one of said treatment chambers;
   the counterweight means comprises at least one weight mounted on said other side;
   the distributing means comprises at least one distribution plate mounted in said only one treatment chamber; and
   the treatment system further comprises collecting means below the container for collecting the treated water and means for bringing the treated water collected into the other treatment chamber for further treatment of the water.

5. A treatment system as claimed in claim 3, wherein:
   the waste water is distributed into said two treatment chambers; and
   the counterweight means comprises at least one additional waste-water receiving means for receiving waste water exiting the water inlet pipe while the trough is in the second position, said waste water received therein flowing out of the same while the trough is in the first position.

6. A treatment system as claimed in claim 5, further comprising:

collecting means below the container for collecting the treated water.

7. A treatment system as claimed in claim 6, further comprising:

a second-stage filtering chamber within the hollow casing, said second-stage filtering chamber comprising additional filtering means; and means for bringing the treated water collected by said collecting means into the second-stage filtering chamber for further treatment of said water.

8. A treatment system as claimed in claim 3, further comprising sampling means for sampling the treated water.

9. A treatment system as claimed in claim 8, wherein the sampling means comprises:

at least one gutter, each gutter being respectively located under a portion of a corresponding treatment chamber for collecting treated water and having a delivering end for exiting the treated water; and a tank for receiving the treated water from said delivering end of said at least one gutter.

10. A treatment system as claimed in claim 3, wherein the aerating system comprises:

at least one air inlet in the container for allowing air to enter the upper portion of said container;

at least one opening on top of said casing for allowing the air in the upper portion of the container to the casing;

an air outlet in the casing for allowing air to exit said casing;

an air outlet pipe connected to the air outlet of the casing and exiting said container, said air outlet pipe to be connected to an air vent;

whereby, while the waste water entering the container is filtered in the treatment chamber, air is allowed to flow through said at least one air inlet over said filtering means and then through said casing to the air vent.

11. The treatment system as claimed in claim 10, wherein the aerating means further comprises an air inlet piping connected with the at least one air inlet and entering into said two treatment chambers in an area above the filtering means.

12. The treatment system as claimed in claim 11, further comprising a ventilator operatively connected to the at least one air inlet of the container.

13. The treatment system as claimed in claim 12, further comprising an air filtering means connected to the at least one air inlet pipe for filtering the air.

14. The combination of a septic tank with a treatment system for treating waste water leaving said septic tank, said septic tank comprising:

a water outlet pipe for allowing waste water to exit said tank and a ventilating piping connected to an air vent system;

said treatment system comprising:

a container having an upper portion, a lower portion, at least one waste water inlet in the upper portion of the container connected to the water outlet pipe of the septic tank for receiving the waste water, and an opening in the lower portion of said container for allowing the treated water to escape said container;

one elongated hollow casing within the lower portion of said container, said casing having an open bottom surface, said casing defining two treatment chambers within said container, each of the treatment chambers comprising filtering means for treating the waste water;

means for distributing the waste water entering the container through the waste water inlet into at least one of said treatment chambers; and aerating means comprising:

at least one air inlet provided in the container for allowing air to enter the upper portion of said container;

at least one opening on top of the casing for allowing air in the upper portion of the container to enter said casing;

an air outlet in the casing for allowing air to exit said casing; and an air outlet pipe connected to the air outlet of the casing and exiting said container, said air outlet pipe being connected to said ventilating piping of the septic tank;

whereby, while the waste water entering the container is filtered in the treatment chambers, air is allowed to flow through said at least one air inlet over said filtering means and then through said casing to the air vent; and wherein said treatment system comprises only one of said at least one water inlet, and wherein said distributing means comprises:

a water inlet pipe connected to said water inlet and leading above said casing;

a trough tiltably mounted on top of the casing, said trough extending along said casing and having two opposite sides, said trough defining at least one waste-water receiving means on one of said two sides, said trough being tillable between a first position where said waste-water receiving means receives waste water exiting the water inlet pipe and a second position where the waste water received in the receiving means may flow out of the same, said trough also having counterweight means on its other side for holding said trough in said first position while it is filled up and for bringing it back from said second position to said first position after said at least one waste-water receiving means has been emptied; and at least one distribution plate mounted above the filtering means in one of said treatment chambers, said at least one distribution plate comprising a plurality of channels projecting from said trough, each of said channels having an end for receiving waste water flowing from the trough so that said waste water is divided into a plurality of flows each flowing in a corresponding channel, each of said channels also having at least one opening for letting the waste water drip into the corresponding treatment chamber.

15. The combination as claimed in claim 14, wherein:

the waste water is distributed into only one treatment chamber;

the counterweight means comprises at least one weight mounted on said other side;

the distributing means comprises at least one distribution plate mounted in said only one treatment chamber; and the treatment system further comprises collecting means below the container for collecting the treated water and means for bringing the treated water collected into the other treatment chamber for further treatment of the water.

16. The combination as claimed in claim 14, wherein:

the waste water is distributed into said two treatment chambers;

the counterweight means comprises at least one additional receiving means for receiving waste water exiting the water inlet pipe while the trough is in the second position, said waste water received therein flowing out of the same while the trough is in the first position.

17. The combination as claimed in claim 16, wherein the aerating means further comprises an air inlet piping connected with the at least one air inlet and entering into said at least one treatment chamber in an area above the filtering means.

18. The combination as claimed in claim 17, further comprising collecting means below the container for collecting the treated water.

19. The combination as claimed in claim 18, further comprising a ventilator operatively connected to the at least one air inlet of the container.

20. The combination as claimed in claim 19, further comprising an air filtering means connected to the at least one air inlet pipe for filtering the air.

* * * * *